US007001955B2

(12) United States Patent
Sasaki et al.

(10) Patent No.: US 7,001,955 B2
(45) Date of Patent: Feb. 21, 2006

(54) ELECTRON BEAM CURING RESIN FOR MAGNETIC RECORDING MEDIUM, METHOD FOR MANUFACTURING THE SAME, AND MAGNETIC RECORDING MEDIUM INCLUDING THE SAME

(75) Inventors: Hideki Sasaki, Tokyo (JP); Shigeo Kurose, Tokyo (JP); Hiroyuki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/855,506

(22) Filed: May 28, 2004

(65) Prior Publication Data

US 2004/0241497 A1    Dec. 2, 2004

(30) Foreign Application Priority Data

May 28, 2003  (JP)  ............................. 2003-150200

(51) Int. Cl.
*C08F 8/30* (2006.01)
*C08F 259/04* (2006.01)
*C08G 18/81* (2006.01)
*C08G 18/82* (2006.01)
*C08L 75/16* (2006.01)

(52) U.S. Cl. .................. 525/278; 522/90; 522/116; 525/293; 525/331.5; 525/454; 525/455; 525/457

(58) Field of Classification Search ................ 522/90, 522/116; 525/278, 293, 331.5, 454, 455, 525/457
See application file for complete search history.

(56) References Cited

U.S. PATENT DOCUMENTS 4,446,286 A * 5/1984 Kolycheck et al. ......... 525/455
4,467,078 A * 8/1984 Kolycheck et al. ......... 525/455
4,647,506 A * 3/1987 Colon et al. ................ 428/413
5,498,685 A * 3/1996 Carlson et al. ............... 528/71
5,512,651 A * 4/1996 Carlson et al. ............... 528/73
6,653,394 B1 * 11/2003 Meisenburg et al. ........ 524/589

FOREIGN PATENT DOCUMENTS

| JP | 1-25141 | 5/1989 |
|----|---------|--------|
| JP | 3-1727 | 1/1991 |
| JP | 4-67314 | 3/1992 |
| JP | 2514682 | 4/1996 |
| JP | 2610468 | 2/1997 |

OTHER PUBLICATIONS

U.S. Appl. No. 10/855,593, filed Feb. 28, 2004, Sasaki, et al.
U.S. Appl. No. 10/855,506, filed May 28, 2004, Sasaki, et al.

* cited by examiner

*Primary Examiner*—Rabon Sergent
(74) *Attorney, Agent, or Firm*—Oblon, Spivak, McClelland, Maier & Neustadt, P.C.

(57) ABSTRACT

An electron beam curing resin for a magnetic recording medium is provided, wherein a known thermosetting vinyl chloride resin or polyurethane resin is modified to become sensitive to an electron beam, and the resulting resin has a high cross-linking property. A method for readily manufacturing the above-described electron beam curing resin from a known thermosetting resin is provided. Furthermore, a high-performance magnetic recording medium including the above-described electron beam curing resin is provided. The electron beam curing resin is produced through a reaction between active hydrogen groups of a vinyl chloride resin or polyurethane resin having the active hydrogen groups in a molecule and a compound having an isocyanate group and a radical-polymerizing unsaturated double bond in a molecule, wherein the amount of water in the reaction system is controlled at 0.05 to 0.5 percent by mass relative to the resin when the reaction is effected.

2 Claims, No Drawings

ELECTRON BEAM CURING RESIN FOR MAGNETIC RECORDING MEDIUM, METHOD FOR MANUFACTURING THE SAME, AND MAGNETIC RECORDING MEDIUM INCLUDING THE SAME

BACKGROUND OF THE INVENTION

1. Field of the Invention

The present invention relates to an electron beam curing resin for a magnetic recording medium, a method for manufacturing the same, and a magnetic recording medium including the same. In particular, it relates to an electron beam curing resin having a high cross-linking property suitable for the magnetic recording medium use, a method for manufacturing the same, in which an electron beam curing resin having a high cross-linking property is produced by modifying a general thermosetting vinyl chloride resin or polyurethane resin to become sensitive to an electron beam, and a magnetic recording medium including the same.

2. Description of the Related Art

Known resins used for magnetic recording media primarily include thermosetting resins and electron beam curing resins. Among them, the thermosetting resin is cured by a method in which active hydrogen groups typified by a hydroxyl group present in the resin and isocyanate compounds are reacted so as to effect cross-linking of the resin. On the other hand, the electron beam curing resin is cured by a method in which electron beam sensitive type functional groups typified by an acrylic double bond are introduced in a molecule of the resin, and cross-linking of the resin is effected by electron beam irradiation.

In general, electron beam curing resins used for magnetic recording media include vinyl chloride resins and polyurethane resins. Examples of methods for modifying the vinyl chloride resins to become sensitive to an electron beam include a method in which hydroxyl groups in a thermosetting vinyl chloride resin having the hydroxyl groups are reacted with tolylene diisocyanate (TDI) adducts resulting from a reaction between tolylene diisocyanate (TDI) and 2-hydroxyethyl methacrylate (2-HEMA), as disclosed in Japanese Examined Patent Application Publication No. 1-25141, a method in which hydroxyl groups in a vinyl chloride resin are reacted with cyclic acid anhydrides and, furthermore, an epoxy monomer having an acrylic double bond is reacted, as disclosed in Japanese Patent No. 2514682, and a method in which hydroxyl groups in a vinyl chloride resin are reacted with 2-isocyanate ethyl (meth) acrylate (MOI), as disclosed in Japanese Unexamined Patent Application Publication No. 4-67314.

On the other hand, with respect to the polyurethane resin, typical examples of methods include a method in which a (meth)acrylate compound having hydroxyl groups in a molecule is used as a part of the raw materials for synthesizing the polyurethane and, thereby, a radiation curing polyurethane resin is produced, as disclosed in Japanese Patent No. 2610468 and a method in which a polyurethane having isocyanate groups at polymer terminals is prepared and, subsequently, is reacted with alcohol having an acrylic double bond, as disclosed in Japanese Examined Patent Application Publication No. 3-1727.

However, with respect to known electron beam sensitive modified materials of vinyl chloride resins or polyurethane resins, coating films do not always have adequate cross-linking properties. Furthermore, if the concentration of hydroxyl groups in the resin is increased in order to improve the cross-linking property, a problem occurs in that the viscosity of the paint is increased.

SUMMARY OF THE INVENTION

Accordingly, it is an object of the present invention to provide an electron beam curing resin for a magnetic recording medium, wherein a known thermosetting vinyl chloride resin or polyurethane resin is modified to become sensitive to the electron beam and, thereby, the resulting resin has a high cross-linking property suitable for the magnetic recording medium use. It is another object of the present invention to provide a method for manufacturing the above-described electron beam curing resin, wherein the electron beam curing resin having a high cross-linking property can readily be produced from a known thermosetting resin. Furthermore, it is another object of the present invention to provide a high-performance magnetic recording medium through the use of the above-described electron beam curing resin.

In order to overcome the above-described problems, the inventors of the present invention conducted intensive research, and found out that an electron beam curing resin having a high cross-linking property and stability was able to be produced by reacting active hydrogen groups of a vinyl chloride resin or polyurethane resin having the active hydrogen groups in a molecule with a compound having an isocyanate group and a radical-polymerizing unsaturated double bond in a molecule in the presence of a predetermined amount of water. Consequently, the present invention has been made.

An electron beam curing resin for a magnetic recording medium of the present invention is a product resulting from a reaction between active hydrogen groups of a vinyl chloride resin or polyurethane resin having the active hydrogen groups in a molecule and a compound having an isocyanate group and a radical-polymerizing unsaturated double bond in a molecule, wherein the amount of water in the reaction system is controlled at 0.05 to 0.5 percent by mass relative to the resin when the reaction is effected.

A method for manufacturing an electron beam curing resin for a magnetic recording medium of the present invention includes the steps of reacting active hydrogen groups of a vinyl chloride resin or polyurethane resin having the active hydrogen groups in a molecule and a compound having an isocyanate group and a radical-polymerizing unsaturated double bond in a molecule in order to prepare the above-described electron beam curing resin for a magnetic recording medium; and controlling the amount of water in the reaction system at 0.05 to 0.5 percent by mass relative to the above-described resin when the reaction is effected. Preferably, the above-described radical-polymerizing unsaturated double bond is contained in a (meth)acrylic group.

A magnetic recording medium of the present invention is provided with a layer containing the above-described electron beam curing resin for a magnetic recording medium on a non-magnetic support.

According to the present invention, an electron beam curing resin for a magnetic recording medium can be produced while having an excellent cross-linking property, wherein a known vinyl chloride resin or polyurethane resin having active hydrogen groups is used as a raw material. Consequently, a high-performance magnetic recording medium can be produced.

DESCRIPTION OF THE PREFERRED EMBODIMENTS

Specific embodiments of the present invention will be described below.

An electron beam curing resin for a magnetic recording medium of the present invention is produced by modifying a vinyl chloride resin or polyurethane resin serving as a raw material to become sensitive to an electron beam through the use of a compound having an isocyanate group and a radical-polymerizing unsaturated double bond in a molecule (hereafter referred to as "a compound serving for modification") in the presence of a specific amount of water.

The vinyl chloride resin or the polyurethane resin used as a raw material in the present invention may be a known (general-purpose) resin or a novel resin. However, the resin must have active hydrogen groups, e.g., hydroxyl groups, primary amines, or secondary amines, in a molecule in order to effect the reaction.

Such a resin is not specifically limited. Specific examples of vinyl chloride resins include MR110, MR104, MR112, MR113 (produced by ZEON Corporation), SOLBIN A, SOLBIN TAO, and SOLBIN MK6 (produced by Nisshin Chemical Industry Co., Ltd.). Examples of polyurethane resins include Estane 5778P, Estane 5799P (produced by BF GOODRICH), UR8700, UR8300 (produced by Toyobo Co., Ltd.), N-3167, N-3301, and TK501K (produced by NIPPON POLYURETHANE INDUSTRY CO., LTD.).

The compound serving for modification is reacted with active hydrogen groups in the resin in order that the resin is modified to become sensitive to an electron beam, and preferably, the compound contains the above-described radical-polymerizing unsaturated double bond in a (meth)acrylic group, a vinyl group, a mercapto group, or the like, in particular in a (meth)acrylic group. Examples of the compound include adducts, e.g., a product (DI-HA adduct) resulting from a reaction between a diisocyanate (DI) and a hydroxy(meth)acrylate compound (HA) and a product (IN-HA adduct) resulting from a reaction between an isocyanurate (IN) which is a trimer of diisocyanate and a hydroxy (meth)acrylate compound (HA). In the present invention, a (meth)acrylic group collectively refers to an acrylic group and a methacrylic group.

Examples of diisocyanates (DI) used as a raw material for such an adduct may include isophorone diisocyanate (IPDI), 2,4-toluene diisocyanate (2,4-TDI), 2,6-toluene diisocyanate (2,6-TDI), 1,4-xylene diisocyanate, hexamethylene diisocyanate, and paraphenylene diisocyanate.

The hydroxy(meth)acrylate compound (HA) is another raw material for the adduct, and is not specifically limited. Specific example thereof include 2-hydroxyethyl acrylate (2-HEA), 2-hydroxyethyl methacrylate (2-HEMA), 2-hydroxypropyl acrylate, hydroxydiethylene glycol methacrylate, butoxyhydroxypropyl acrylate, phenoxyhydroxypropyl acrylate, hydroxypropyl dimethacrylate, glycidol dimethacrylate, glycerol dimethacrylate, and monohydroxypentaerythritol triacrylate.

The adduct and active hydrogen in a vinyl chloride resin or a polyurethane resin are reacted and, thereby, the resin is modified to become sensitive to an electron beam. The reaction is performed in an organic solvent, e.g., methyl ethyl ketone (MEK) or toluene. In this reaction, preferably, the synthesis is usually effected through the use of 0.005 to 0.1 parts by mass of urethane catalyst, e.g., dibutyltin dilaurate or tin octylate, relative to 100 parts by mass of the total amount of reactants.

In the present invention, it is important that the amount of water in the reaction system is controlled at 0.05 to 0.5 percent by mass relative to the total amount of resin, preferably at 0.06 to 0.3 percent by mass when the reaction is effected. In this manner, an electron beam curing resin having a high cross-linking property can be produced. Reasons for the improvement in cross-linking property by controlling the amount of water in the reaction system at within the above-described range include that multifunctional acrylic monomers become present in the reaction system by reaction of adducts with water, and, therefore, the water serves a function as a cross-linking accelerator. If the amount of water in the reaction system is less than 0.05 percent by mass, the effect as the cross-linking accelerator is inadequate. On the other hand, even if the amount of water exceeds 0.05 percent by mass, an effect of further increasing the cross-linking property is not expected. Contrarily, the monomer components become excessive and, thereby, the dispersibility is reduced. Preferably, the reaction temperature is 30° C. to 80° C., and more preferably is 50° C. to 70° C.

The thus produced electron beam curing resins can be used as binders of resin undercoat layers, undercoat layers containing inorganic pigments, back coating layers, and magnetic layers in magnetic recording media. Hereafter these layers may be collectively referred to as "functional layers". The electron beam curing resin may be used alone, or in the form of a mixture with other resins typified by a polyurethane resin.

Preferably, the amount of irradiation in cross-linking of the electron beam curing resin of the present invention by the use of an electron beam is 1 to 10 Mrad, and more preferably is 3 to 7 Mrad. Preferably, the irradiation energy (acceleration voltage) is at least 100 kV.

In the present invention, the above-described electron beam curing resin is used as a binder of the functional layer and, thereby, a high-performance magnetic recording medium provided with a functional layer having a high cross-linking property and excellent solvent resistance can be produced. It is only essential that the magnetic recording medium of the present invention is provided with a layer containing the above-described electron beam curing resin of the present invention on a non-magnetic support, and other constituent materials, additives, and the like are not specifically limited. For example, the following materials may be used.

The non-magnetic support may be appropriately selected from known resin films, e.g., polyesters, polyamides, and aromatic polyamides, and resin films composed of laminates of them. The thickness thereof and the like may be within known ranges, and are not specifically limited.

A ferromagnetic powder used for the magnetic layer is an acicular ferromagnetic metal powder preferably having an average major-axis length of 0.15 μm or less, and more preferably of 0.03 to 0.10 μm. If the average major-axis length exceeds 0.15 μm, it tends to become difficult to adequately satisfy the electromagnetic conversion characteristic (in particular the S/N characteristic and the C/N characteristic) required of the magnetic recording medium. A hexagonal iron oxide powder, e.g., barium ferrite, may be used as well. Preferably, the plate ratio of the hexagonal iron oxide powder is 2 to 7. Preferably, the average primary plate diameter determined by TEM observation is 10 to 50 nm. If larger than this, the surface of the magnetic layer tends to become deteriorated.

It is essential that the content of the above-described ferromagnetic powder in the magnetic layer composition is about 70 to 90 percent by mass. If the content of the ferromagnetic powder is too large, the content of the binder is decreased and, thereby, the surface smoothness resulting from calendering tends to become deteriorated. On the other hand, if too small, a high playback output is not readily achieved.

A binder resin for the magnetic layer is not specifically limited and, besides the above-described electron beam curing resins of the present invention, previously known thermoplastic resins, thermosetting resins, other radiation curing resins, and mixtures thereof may be suitable for the binder resin.

Preferably, the content of the binder resin used for the magnetic layer is 5 to 40 parts by mass relative to 100 parts by mass of the ferromagnetic powder, in particular is 10 to 30 parts by mass. If the content of the binder resin is too small, the strength of the magnetic layer is reduced and, thereby, the running durability tends to become deteriorated. On the other hand, if the content is too large, the content of the ferromagnetic metal powder is reduced and, thereby, the electromagnetic conversion characteristic becomes deteriorated.

Examples of cross-linking agents for curing these binder resins may include various known polyisocyanates in the case of thermosetting resins. Preferably, the content of this cross-linking agent is 10 to 30 parts by mass relative to 100 parts by mass of the binder resin. If necessary, an abrasive, a dispersing agent, e.g., a surfactant, a higher aliphatic acid, and other various additives may be added to the magnetic layer.

A paint for forming the magnetic layer is prepared by adding an organic solvent to the above-described components. The organic solvent to be used is not specifically limited, and at least one solvent may be appropriately selected from various solvents, for example, ketone solvents, e.g., methyl ethyl ketone (MEK), methyl isobutyl ketone, and cyclohexanone; and aromatic solvents, e.g., toluene. The amount of addition of the organic solvent may be about 100 to 1,100 parts by mass relative to 100 parts by mass of the total amount of the solid (the ferromagnetic metal powder, various inorganic particles, and the like) and the binder resin.

The thickness of the magnetic layer in the present invention is controlled at 3.0 μm or less, preferably at 0.01 to 0.50 μm, and more preferably at 0.02 to 0.30 μm. If the magnetic layer is too thick, the self-demagnetization loss and the thickness loss are increased.

A non-magnetic layer serving as the above-described undercoat layer may be provided between the magnetic layer and the non-magnetic support and, thereby, the electromagnetic conversion characteristic of the thin magnetic layer is improved, so that the reliability is further increased.

Various inorganic powders may be used as the non-magnetic powder used for the non-magnetic layer. Preferable examples thereof may include acicular non-magnetic powders, e.g., acicular non-magnetic iron oxide ($\alpha$-$Fe_2O_3$). Other non-magnetic powders, e.g., calcium carbonate ($CaCO_3$), titanium oxide ($TiO_2$), barium sulfate ($BaSO_4$), and $\alpha$-alumina ($\alpha$-$Al_2O_3$), may be appropriately compounded. Preferably, carbon black is used for the non-magnetic layer. Examples of the above-described carbon black may include furnace black for rubber, thermal black for rubber, black for a color, and acetylene black.

Preferably, the compounding ratio of the carbon black to the inorganic powder is 100/0 to 10/90 on a weight ratio basis. If the compounding ratio of the inorganic powder exceeds 90, a problem of surface electric resistance tends to occur.

With respect to a binder resin for the non-magnetic layer, besides the above-described electron beam curing resins of the present invention, previously known thermoplastic resins, thermosetting resins, other radiation curing resins, and mixtures thereof may be used in a manner similar to that in the magnetic layer. Among them, the radiation curing resins are preferable.

If necessary, a dispersing agent, e.g., a surfactant; a higher aliphatic acid; a lubricant, e.g., an aliphatic ester and silicone oil; and other various additives, which are used in the magnetic layer, may be further added to the non-magnetic layer of the present invention. A paint for the non-magnetic layer may be prepared through the use of an organic solvent similar to that in the above-described magnetic layer with the same level of amount of addition.

Preferably, the thickness of the non-magnetic layer is 2.5 μm or less, and more preferably is 0.1 to 2.3 μm. Even when the thickness exceeds 2.5 μm, any improvement of the performance cannot be expected. Contrarily, when the coating film is provided, the thickness tends to become uneven, the coating condition becomes severe, and the surface smoothness tends to become deteriorated.

If necessary, the back coating layer is provided in order to improve the running stability, to prevent the charging of the magnetic layer, and the like. Preferably, the back coating layer contains 30 to 80 percent by mass of carbon black. Any type of usually available carbon black may be used as the above-described carbon black, and carbon black similar to that used in the above-described non-magnetic layer may be used. In addition to the carbon black, if necessary, non-magnetic inorganic powders, e.g., various abrasives; a dispersing agent, e.g., a surfactant; a higher aliphatic acid; a lubricant, e.g., an aliphatic ester and silicone oil; and other various additives, which are used in the magnetic layer, may be added.

The thickness of the back coating layer (after calendering) is 0.1 to 1.5 μm, and preferably is 0.2 to 0.8 μm. If the thickness exceeds 1.5 μm, friction between a medium sliding contact path and the back coating layer becomes too large and, thereby, the running stability tends to become deteriorated. On the other hand, if less than 0.1 μm, shaving of the coating film of the back coating layer tends to occur during running of the medium.

EXAMPLES

The present invention will be described below in further detail with reference to the examples. In the following description, "part" refers to "part by mass" and "percent" refers to "percent by mass".

Synthetic Example 1

Resin 1

A one-liter three neck flask was supplied with 424 parts of isophorone diisocyanate (IPDI), 0.4 parts of dibutyltin dilaurate, and 0.24 parts of 2,6-di-tert-butyl-4-methylphenol (BHT), and thereafter, 372 parts of 2-hydroxypropyl acrylate (2HPA) was dropped while the temperature was controlled at 60° C. After the dropping was completed, agitation was performed at 60° C. for 2 hours, and the product was taken out, so that an IPDI-2HPA adduct was prepared.

Subsequently, 630 parts of MR110 produced by ZEON Corporation was dissolved into 2,291 parts of methyl ethyl ketone (MEK). The amount of water was measured, and the result was 0.03 percent. Consequently, water was added in order that the amount of water became 0.2 percent, and 2.45 parts of dibutyltin dilaurate and 0.09 parts of 2,6-di-tert-butyl-4-methylphenol (BHT) were put in. After agitation was performed at 70° C. for 3 hours, 352 parts of IPDI-2HPA adduct prepared as described above was put in. After agitation was performed at 70° C. for 15 hours, disappearance of the characteristic absorption (2,270 cm$^{-1}$) of the isocyanate group was ascertained in the IR spectrum, and the product was taken out, so that a resin 1 was prepared.

Synthetic Example 2

Resin 2

A resin 2 was prepared as in Synthetic example 1 except that the amount of water was controlled at 0.06 percent in Synthetic example 1.

Synthetic Example 3

Resin 3

A resin 3 was prepared as in Synthetic example 1 except that the amount of water was controlled at 0.3 percent in Synthetic example 1.

Synthetic Example 4

Resin 4

A one-liter three neck flask was supplied with 504 parts of HDI nurate, 0.18 parts of dibutyltin dilaurate, and 0.22 parts of 2,6-di-tert-butyl-4-methylphenol (BHT), and thereafter, 232 parts of 2-hydroxyethyl acrylate (2HEA) was dropped while the temperature was controlled at 60° C. After the dropping was completed, agitation was performed at 60° C. for 2 hours, and the product was taken out, so that an HDI nurate-2HEA adduct was prepared.

A one-liter three neck flask was supplied with 833 parts of VYLON UR8300 produced by Toyobo Co., Ltd. The amount of water was measured, and the result was 0.03 percent. Consequently, water was added in order that the amount of water became 0.2 percent, and 0.5 parts of dibutyltin dilaurate and 0.05 parts of 2,6-di-tert-butyl-4-methylphenol (BHT) were put in. After agitation was performed at 70° C. for 1 hour, 13 parts of HDI nurate-2HEA adduct prepared as described above was put in. After agitation was performed at 70° C. for 15 hours, disappearance of the characteristic absorption (2,270 cm$^{-1}$) of the isocyanate group was ascertained in the IR spectrum, and the product was taken out, so that a resin 4 was prepared.

Synthetic Example 5

Resin 5

A resin 5 was prepared as in Synthetic example 4 except that the amount of water was controlled at 0.06 percent in Synthetic example 4.

Synthetic Example 6

Resin 6

A resin 6 was prepared as in Synthetic example 4 except that the amount of water was controlled at 0.3 percent in Synthetic Example 4.

Synthetic Example 7

Resin 7

A resin 7 was prepared as in Synthetic example 1 except that the amount of water was not controlled in Synthetic example 1.

Synthetic Example 8

Resin 8

A resin 8 was prepared as in Synthetic example 4 except that the amount of water was not controlled in Synthetic example 4.

Synthetic Example 9

Resin 9

A resin 9 was prepared as in Synthetic example 1 except that the amount of water was controlled at 0.7 percent in Synthetic example 1.

Synthetic Example 10

Resin 10

A resin 10 was prepared as in Synthetic example 4 except that the amount of water was controlled at 0.7 percent in Synthetic example 4.

Example 1

(Evaluation 1) Evaluation of Cross-Linking Property

A coating of the resin 1 of 30 μm in thickness was formed on a release film and, thereafter, 6 Mrad of electron beam was applied under the condition of an acceleration voltage of 200 kV, so that the coating was cured. Subsequently, the resin coating after subjected to the electron beam curing was peeled off the release film, and the gel ratio was measured under the following condition.

<Gel Ratio Measurement Condition>
solvent: methyl ethyl ketone (MEK)
extraction condition: MEK boiling
extraction time: 5 hours Extraction was performed under the above-described condition, the weight of the resin coating was measured before and after the extraction, and the gel ratio was calculated from the difference between the weights.

(Evaluation 2) Evaluation of Cross-Linking Property and Dispersibility of Coating Containing Pigment or Magnetic Powder With respect to three types of system including a magnetic metal powder, an α-iron oxide/carbon black mixture, and carbon black, evaluation of the solvent resistance was performed as the evaluation of cross-linking property of each sample in which any one of the systems was dispersed in a resin and cross-linking was effected. In addition, the surface roughness (Ra) was measured in order to evaluate the dispersibility.

(1) Evaluation of Magnetic Metal Powder

| Preparation of magnetic paint sample | |
|---|---|
| magnetic metal powder (Fe/Co/Al/Y = 100/10/5.2/2.0 (weight ratio)) (Hc = 145.6 kA/m (1,830 Oe), σs = 130 Am²/kg, BET specific surface area = 57 m²/g, average major-axis length = 0.10 μm) | 100 parts |
| resin 1 | 70 parts |
| MEK | 120 parts |
| toluene | 120 parts |
| cyclohexanone | 70 parts |

The above-described composition was subjected to a kneading treatment and, thereafter, dispersion was performed with a sand grinder mill, so that a magnetic paint was prepared.

The resulting magnetic paint was applied to a polyethylene terephthalate (PET) film of 6.1 μm in thickness in order that the thickness after drying became 1.5 μm. After drying was performed at a drying temperature of 100° C., a calender treatment was performed at a linear pressure of 2.9×10⁵ N/m and a temperature of 90° C. Subsequently, electron beam (EB) irradiation (6 Mrad) was performed, so that a cured coating of the magnetic paint was prepared.

(2) Evaluation of α-Iron Oxide/Carbon Black Mixture System Pigment

| Preparation of non-magnetic paint sample | |
|---|---|
| non-magnetic powder: acicular α-Fe₂O₃ (average minor-axis diameter = 18 nm, aspect ratio = 6.1, pH = 8.9) | 80 parts |
| carbon black (#850B: produced by MITSUBISHI CHEMICAL CORPORATION) (average particle diameter = 16 nm, BET specific surface area = 200 m²/g, DBP oil absorption = 70 ml/100 g) | 20 parts |
| resin 1 | 70 parts |
| MEK | 120 parts |
| toluene | 120 parts |
| cyclohexanone | 70 parts |

The above-described composition was subjected to a kneading treatment and, thereafter, dispersion was performed with a sand grinder mill, so that a non-magnetic paint was prepared.

The resulting non-magnetic paint was applied to a PET film of 6.1 μm in thickness in order that the thickness after drying became 1.5 μm. After drying was performed at a drying temperature of 100° C., a calender treatment was performed at a linear pressure of 2.9×10⁵ N/m and a temperature of 90° C. Subsequently, EB irradiation (6 Mrad) was performed, so that a cured coating of the non-magnetic paint was prepared.

(3) Evaluation of Carbon Black System

| Preparation of carbon black paint sample | |
|---|---|
| carbon black (Conductex SC: produced by Columbian Carbon, average particle diameter = 20 nm, BET specific surface area = 220 m²/g) | 100 parts |

| Preparation of carbon black paint sample | |
|---|---|
| carbon black (Sevacarb MT: produced by Columbian Carbon, average particle diameter = 350 nm, BET specific surface area = 8 m²/g) | 1 part |
| resin 1 | 330 parts |
| MEK | 350 parts |
| toluene | 350 parts |
| cyclohexanone | 170 parts |

The above-described composition was subjected to a kneading treatment and, thereafter, dispersion was performed with a sand grinder mill.

The resulting carbon black paint was applied to a PET film of 6.1 μm in thickness in order that the thickness after drying became 1.5 μm. After drying was performed at a drying temperature of 100° C., a calender treatment was performed at a linear pressure of 2.9×10⁵ N/m and a temperature of 70° C. Subsequently, EB irradiation (6 Mrad) was performed, so that a cured coating of the carbon black paint was prepared.

With respect to each coating sample prepared by the above-described method, the solvent resistance was evaluated based on the following method and criteria.

(a) An MEK-impregnated cotton swab was used.

(b) The cotton swab was rubbed against the surface of the coating.

(c) The number of rubbing required to eliminate the coating was counted.

(d) Criteria (the number of rubbing)

at least 10: ○

5 or more and less than 10: Δ

1 or more and less than 5: x

In order to evaluate the surface roughness, the measurement was performed under the following condition.

measurement device: Talystep System produced by Taylor Hobson K.K.

measurement condition:

filter condition: 0.18 to 9 Hz probe: 0.1×2.5 μm specific stylus probe load: 2 mg measurement speed: 0.03 mm/sec measurement length: 500 μm Example 2

A coating sample was prepared and evaluated as in Example 1 except that the resin 2 was used in place of the resin 1 used in Example 1.

Example 3

A coating sample was prepared and evaluated as in Example 1 except that the resin 3 was used in place of the resin 1 used in Example 1.

Example 4

A coating sample was prepared and evaluated as in Example 1 except that the resin 4 was used in place of the resin 1 used in Example 1.

Example 5

A coating sample was prepared and evaluated as in Example 1 except that the resin 5 was used in place of the resin 1 used in Example 1.

Example 6

A coating sample was prepared and evaluated as in Example 1 except that the resin 6 was used in place of the resin 1 used in Example 1.

Comparative Example 1

A coating sample was prepared and evaluated as in Example 1 except that the resin 7 was used in place of the resin 1 used in Example 1.

Comparative Example 2

A coating sample was prepared and evaluated as in Example 1 except that the resin 8 was used in place of the resin 1 used in Example 1.

Comparative Example 3

A coating sample was prepared and evaluated as in Example 1 except that the resin 9 was used in place of the resin 1 used in Example 1.

Comparative Example 4

A coating sample was prepared and evaluated as in Example 1 except that the resin 10 was used in place of the resin 1 used in Example 1.

The resins and the amounts of water in the reaction systems, which were used in Examples 1 to 6 and Comparative examples 1 to 4, are collectively shown in the following Table 1. The evaluation results are shown in the following Table 2 and Table 3.

TABLE 1

|  | Resin No | Amount of water (%) | Resin |
|---|---|---|---|
| Example 1 | 1 | 0.2 | MR110 |
| Example 2 | 2 | 0.06 | MR110 |
| Example 3 | 3 | 0.3 | MR110 |
| Example 4 | 4 | 0.2 | UR8300 |
| Example 5 | 5 | 0.06 | UR8300 |
| Example 6 | 6 | 0.3 | UR8300 |
| Comparative example 1 | 7 | 0.03 | MR110 |
| Comparative example 2 | 8 | 0.03 | UR8300 |
| Comparative example 3 | 9 | 0.7 | MR110 |
| Comparative example 4 | 10 | 0.7 | UR8300 |

TABLE 2

|  |  | Example 1 | Example 2 | Example 3 | Example 4 | Example 5 | Example 6 |
|---|---|---|---|---|---|---|---|
|  | Resin | Resin 1 | Resin 2 | Resin 3 | Resin 4 | Resin 5 | Resin 6 |
|  | Gel ratio (%) | 96 | 87 | 97 | 95 | 84 | 97 |
| Solvent resistance | Magnetic paint coating | ○ | ○ | ○ | ○ | ○ | ○ |
|  | Non-magnetic paint coating | ○ | ○ | ○ | ○ | ○ | ○ |
|  | Carbon black paint coating | ○ | ○ | ○ | ○ | ○ | ○ |
| Surface roughness (nm) | Magnetic paint coating | 4.5 | 4.7 | 4.7 | 5.3 | 5.4 | 5.5 |
|  | Non-magnetic paint coating | 3.6 | 3.7 | 3.8 | 4.4 | 4.7 | 4.0 |
|  | Carbon black paint coating | 9.0 | 9.5 | 9.2 | 13.5 | 14.0 | 12.7 |

TABLE 3

|  |  | Comparative example 1 | Comparative example 2 | Comparative example 3 | Comparative example 4 |
|---|---|---|---|---|---|
|  | Resin | Resin 7 | Resin 8 | Resin 9 | Resin 10 |
|  | Gel ratio (%) | 70 | 35 | 97 | 97 |
| Solvent resistance | Magnetic paint coating | Δ | X | ○ | ○ |
|  | Non-magnetic paint coating | Δ | X | ○ | ○ |
|  | Carbon black paint coating | Δ | X | ○ | ○ |
| Surface roughness (nm) | Magnetic paint coating | 4.6 | 5.2 | 6.5 | 7.0 |
|  | Non-magnetic paint coating | 3.9 | 4.5 | 6.9 | 6.8 |
|  | Carbon black paint coating | 10.0 | 12.5 | 19.8 | 17.7 |

What is claimed is:

1. A method for manufacturing an electron beam curing resin for a magnetic recording medium, the electron beam curing resin being a product resulting from a reaction between active hydrogen groups of a vinyl chloride resin or polyurethane resin having the active hydrogen groups in a molecule and a compound having an isocyanate group and a radical-polymerizing unsaturated double bond in a molecule, wherein the amount of water in the reaction system is controlled at 0.05 to 0.5 percent by mass relative to the resin when the reaction is effected, comprising the steps of:

reacting active hydrogen groups of a vinyl chloride resin or polyurethane resin having the active hydrogen groups in a molecule and a compound having an isocyanate group and a radical-polymerizing unsaturated double bond in a molecule in order to prepare the electron beam curing resin for a magnetic recording medium; and controlling the amount of water in the reaction system at 0.05 to 0.5 percent by mass relative to the resin when the reaction is effected.

2. The method for manufacturing an electron beam curing resin for a magnetic recording medium according to claim 1, wherein the radical-polymerizing unsaturated double bond is contained in a (meth)acrylic group.

* * * * *